United States Patent
Wu et al.

(10) Patent No.: US 11,301,488 B2
(45) Date of Patent: Apr. 12, 2022

(54) METHOD, ELECTRONIC DEVICE AND COMPUTER PROGRAM PRODUCT FOR DATA PROCESSING

(71) Applicant: EMC IP Holding Company LLC, Hopkinton, MA (US)

(72) Inventors: Pengfei Wu, Shanghai (CN); Jinpeng Liu, Shanghai (CN); Kun Wang, Beijing (CN); Ming Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 319 days.

(21) Appl. No.: 16/291,022

(22) Filed: Mar. 4, 2019

(65) Prior Publication Data

US 2020/0117679 A1 Apr. 16, 2020

(30) Foreign Application Priority Data

Oct. 12, 2018 (CN) .......................... 201811192254.2

(51) Int. Cl.
  *G06F 16/27* (2019.01)
  *G06F 16/22* (2019.01)
  *H04L 67/1095* (2022.01)
  *H04L 67/1097* (2022.01)

(52) U.S. Cl.
  CPC .......... *G06F 16/27* (2019.01); *G06F 16/2255* (2019.01); *H04L 67/1095* (2013.01); *H04L 67/1097* (2013.01)

(58) Field of Classification Search
  CPC .... G06F 16/27; G06F 16/2255; G06F 16/137; H04L 67/1095; H04L 67/1097
  See application file for complete search history.

(56) References Cited

U.S. PATENT DOCUMENTS

| | | | | |
|---|---|---|---|---|
| 5,555,404 A | * | 9/1996 | Torbjørnsen | G06F 11/2094 |
| 2014/0108707 A1 | * | 4/2014 | Nowoczynski | G06F 3/0688 711/103 |
| 2017/0032014 A1 | * | 2/2017 | Dickie | G06F 16/278 |
| 2018/0004777 A1 | * | 1/2018 | Bulkowski | G06F 16/27 |

OTHER PUBLICATIONS

Maymounkov, P., & Mazieres, D. (Mar. 2002,). Kademlia: A peer-to-peer information system based on the xor metric. In International Workshop on Peer-to-Peer Systems (pp. 53-65). Springer, Berlin, Heidelberg. (13 pages).

* cited by examiner

*Primary Examiner* — Mark D Featherstone
*Assistant Examiner* — Samuel C Sharpless, III
(74) *Attorney, Agent, or Firm* — Chamberlain, Hrdlicka, White, Williams & Aughtry (57) ABSTRACT

Embodiments of the present disclosure provide a method, an electronic device and a computer program product for data processing. In one embodiment, the method includes determining, at a first node in a network, one or more nodes in the network storing replicas of target data based on a hash value associated with the target data in the network. The method further includes executing replica maintenance for the target data, which includes determining the number of available nodes in the one or more nodes comparing a number of the available nodes with the predetermined number of replicas of the target data in the network and in response to the number of the available nodes being different than the predetermined number, changing storage distribution of replicas of the target data in the network.

12 Claims, 5 Drawing Sheets

METHOD, ELECTRONIC DEVICE AND COMPUTER PROGRAM PRODUCT FOR DATA PROCESSING

FIELD

Embodiments of the present disclosure generally relate to a field of data processing, and more specifically, to a method, an electronic device and a computer program product for data processing.

BACKGROUND

In a data processing system, it is very important to keep track of the number of replicas of each data block. Hardware failures or software failures may occur in nodes of the system, resulting in data loss. Therefore, users have to set the number of replicas for data in the system based on the actual operation of the system. If the number of the data replicas is too small in the network, data loss will likely occur. However, if the number of data replicas is too large, it is possible to incur excess data redundancy.

SUMMARY

Embodiments of the present disclosure provide a method, electronic device and computer program product for data processing, and intend to address at least partly the above and/or other potential problems in the field of data processing.

In a first aspect, embodiments of the present disclosure provide a method of data processing. The method comprises determining, at a first node in a network, one or more nodes in the network storing replicas of target data, based on a hash value associated with the target data in the network, executing replica maintenance for the target data, comprising: determining the number of available nodes in the one or more nodes; comparing the number of the available nodes with the predetermined number of replicas of the target data in the network, in response to the number of the available nodes being different than the predetermined number, changing storage distribution of replicas of the target data in the network.

In some embodiments, changing storage distribution of replicas of the target data comprises: in response to the number of the available nodes being greater than the predetermined number, deleting a replica of the target data from at least one of the one or more nodes, and, in response to the number of the available nodes being less than the predetermined number, creating a replica of the target data on at least one further node in the network.

In some embodiments, executing replica maintenance for the target data comprises: obtaining a first timestamp associated with the target data, the first timestamp recording a time point when a second node executes last replica maintenance for the target data, the second node being different than the first node, and, in response to a time length since the time point recorded by the first timestamp exceeding a predetermined threshold, executing replica maintenance for the target data.

In some embodiments, obtaining the first timestamp comprises obtaining, from a local database of the first node, the first timestamp previously stored in the local database.

In some embodiments, the method further comprises creating a second timestamp for recording a time point of the replica maintenance for the target data at the first node, and sending the second timestamp to other nodes in the network which store replicas of the target data.

In some embodiments, the target data are one of a plurality of data blocks of a data item, and wherein determining the one or more nodes comprises: obtaining a hash chain associated with the data item from a metadata node in the network, the hash chain recording a relationship among the plurality of data blocks, and determining one or more nodes of the plurality of data blocks based on the hash chain.

In a second aspect, embodiments of the present disclosure provide an electronic device. The electronic device comprises: at least one processing unit and at least one memory coupled to the at least one processing unit and storing instructions executed by the at least one processing unit, the instructions, when executed by the at least one processing unit, causing the device to execute acts comprising: determining, at a first node in a network, one or more nodes in the network storing replicas of target data, based on a hash value associated with the target data in the network, executing replica maintenance for the target data, comprising: determining the number of available nodes in the one or more nodes, comparing the number of the available nodes with the predetermined number of replicas of the target data in the network, in response to the number of the available nodes being different than the predetermined number, changing storage distribution of replicas of the target data in the network.

In a third aspect, embodiments of the present disclosure provide a computer program product. The computer program product is tangibly stored on a non-transitory computer storage medium and includes machine-executable instructions. The machine-executable instructions, when executed by a device, causing the device to execute any step of the method as described in the first aspect of the present disclosure.

This Summary is provided to introduce a selection of concepts in a simplified form that are further described hereinafter in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent, through the following detailed description of the example embodiments of the present disclosure with reference to the accompanying drawings, in which the same reference signs generally refer to the same elements.

DETAILED DESCRIPTION OF EMBODIMENTS

Preferred implementations of the present disclosure will be described hereinafter in more detail with reference to the accompanying drawings. It should be appreciated that although the drawings illustrate preferred embodiments of the present disclosure, the present disclosure may be implemented in various manners and should not be construed as being limited to the implementations illustrated herein. Rather, these implementations are provided to make the present disclosure more thoroughly and completely, and to fully convey the scope of the present disclosure to those skilled in the art.

As used herein, the term "include" and its variants are to be read as open-ended terms that mean "include, but not limited to." The term "or" is to be read as "and/or" unless the context clearly indicates otherwise. The term "based on" is to be read as "based at least partially on." The term "an embodiment" and "the embodiment" are to be read as "at least one embodiment." The term "another embodiment" is to be read as "at least another embodiment." The terms "first," "second," and the like may indicate the different or the same objects. Other explicit or implicit definitions may be included hereinafter.

In order to prevent data loss on nodes caused by the failure of nodes in a network, it is typically required to monitor the number of replicas of data in the network, thereby changing the storage distribution of replicas of the data over the network when the number of available replicas in the network is not consistent with the desired number of replicas.

Figure 1:
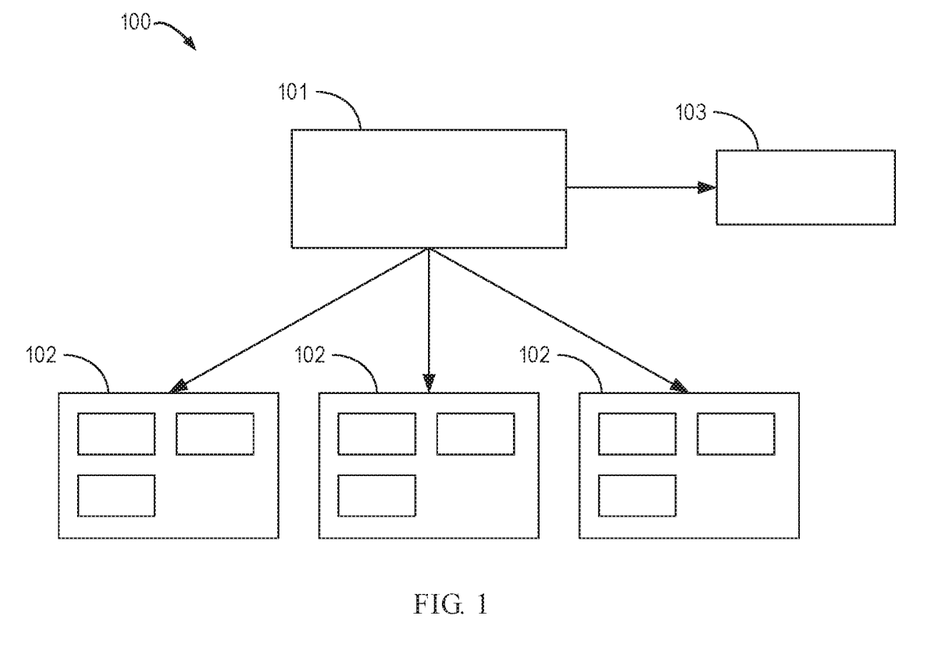
FIG. 1 illustrates a diagram of a traditional network environment including a master node.

FIG. 1 illustrates a diagram of a traditional network system 100 including a master node. In a traditional centralized replica monitoring system 100 as shown in FIG. 1, a master node 101 is required to manage a plurality of data nodes 102 in the network via metadata 103. The master node 101 is executing on a main server (not shown).

It can be seen from FIG. 1 that the traditional system 100 includes a separate master node 101 for maintaining index information among nodes. However, if the master node 101 fails, the system 100 is then faced with the problem of a single point of failure. Moreover, as described above, because the index information of all nodes in the system 100 is stored in the node 101, the amount of data processing in the system 100 is limited by the capacity of the master node 101.

Figure 2:
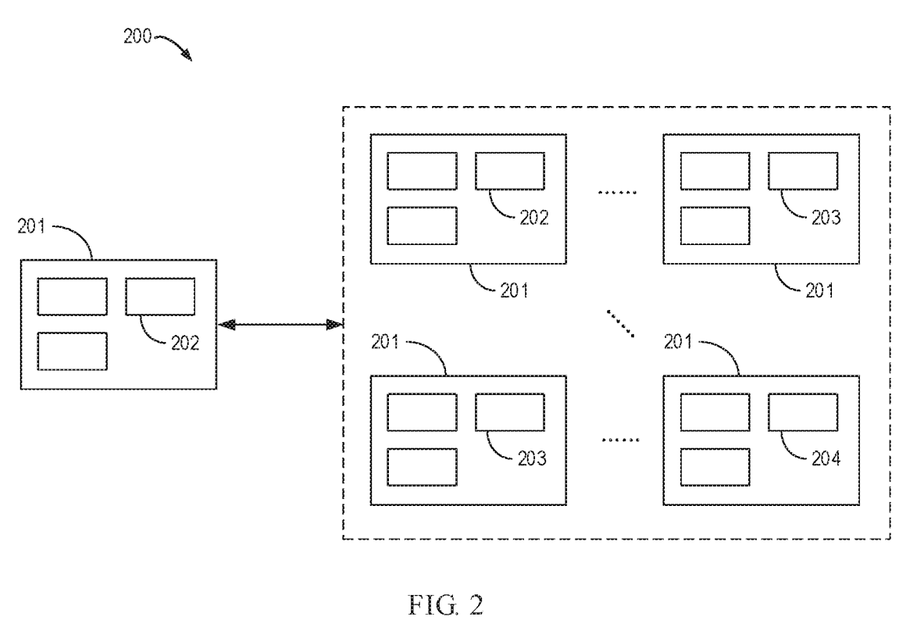
FIG. 2 illustrates a diagram of an example environment in which embodiments of the present disclosure can be implemented.

FIG. 2 illustrates a diagram of an example environment 200 in which embodiments of the present disclosure can be implemented. As shown, each node 201 may interact with other nodes 201 in the network. The node 201 stores data 202. The data 202 may be represented in any form, such as file, audio, video or the like. The data 202 require one or more replicas to ensure that the data 202 would not be lost in the network. It would be appreciated that the structure and functionality of the example environment 200 are described for illustration, without implying any limitation to the scope of the present disclosure. Embodiments of the present disclosure may also be applied to an environment having a different structure and/or functionality.

As can be seen from FIG. 2, the configuration according to embodiments of the present disclosure does not include a separate master node 101 as shown in FIG. 1. As a result, the problem of single point of failure will not occur, storage spaces of all nodes can be utilized, and the capacity of the system can be expanded accordingly.

Figure 3:
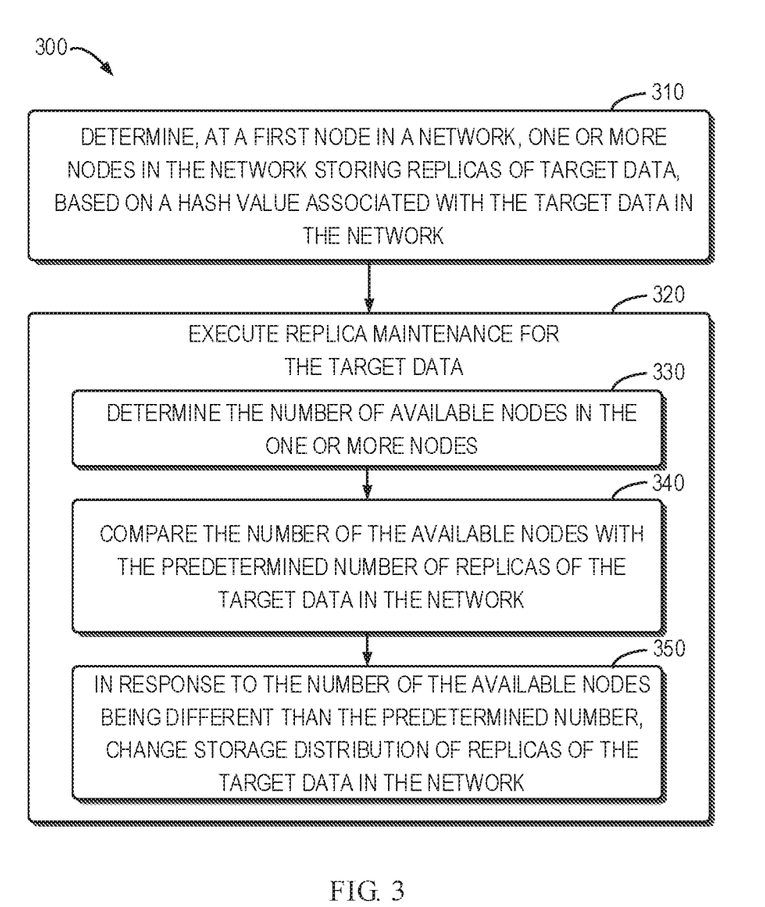
FIG. 3 illustrates a flowchart of a method of data processing according to embodiments of the present disclosure.
Figure 4:
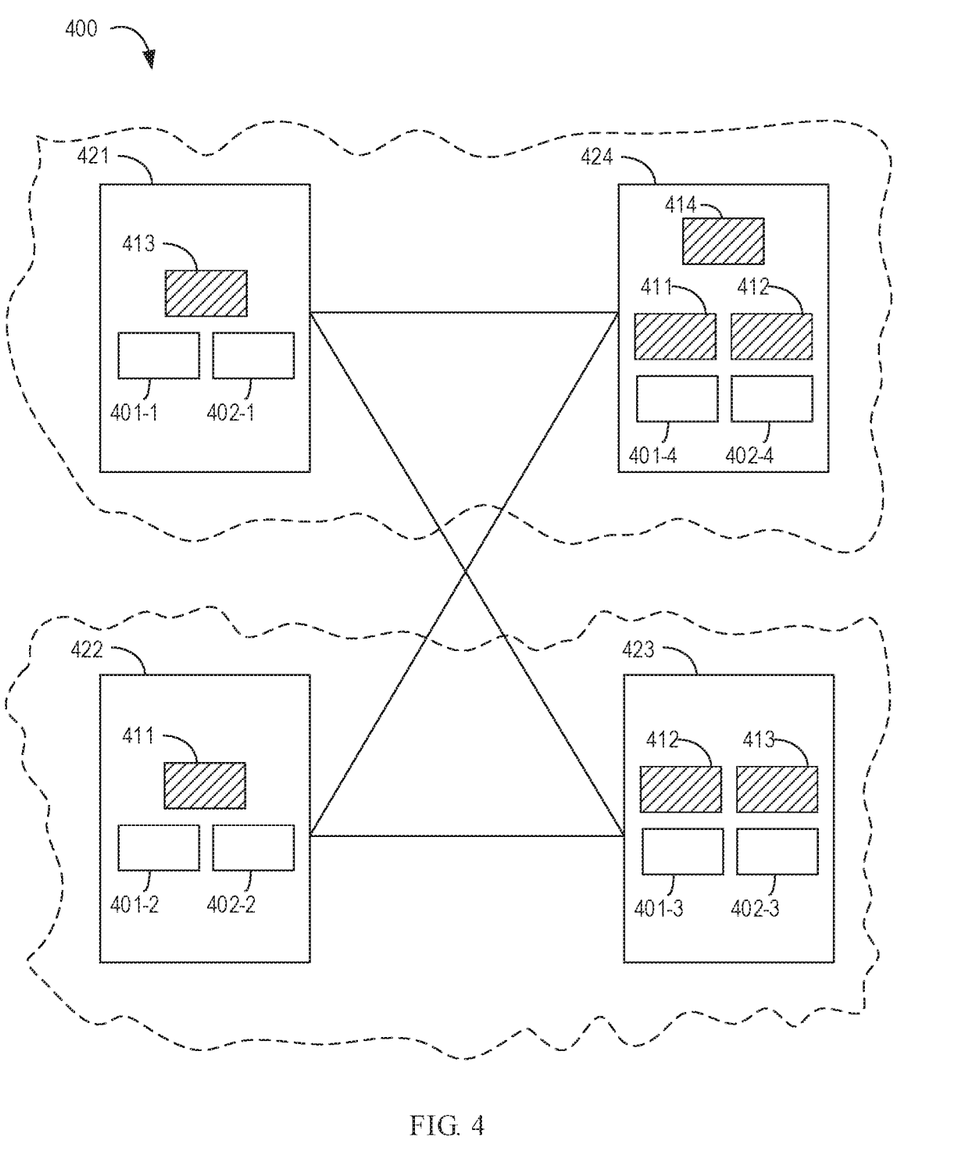
FIG. 4 illustrates a diagram of a method of data processing according to embodiments of the present disclosure.
Figure 5:
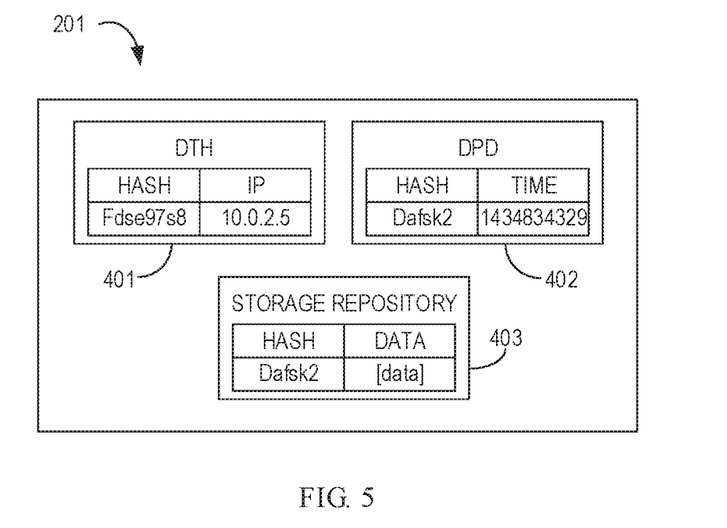
FIG. 5 illustrates an example implementation of a node according to embodiments of the present disclosure.

Embodiments of the present disclosure will be described hereinafter with reference to FIGS. 3 to 5. FIG. 3 illustrates a flowchart of a method 300 of data processing according to embodiments of the present disclosure. FIG. 4 illustrates a diagram of a method of data processing according to embodiments of the present disclosure. FIG. 5 illustrates an example implementation of a node 201 according to embodiments of the present disclosure. The method 300 may be executed by the nodes 201 as shown in FIG. 2. Various acts in the method 300 will be described hereinafter with reference to FIGS. 2 to 5. A node 421 in FIG. 4 will be taken as an example for describing the method 300. It should be appreciated that the method 300 may include additional acts not shown and/or may skip the acts as shown, and the scope of the present disclosure is not limited in this aspect.

At block 310, at a first node 421 in a network 400, one or more nodes storing replicas of target data 413 in the network 400 may be determined, based on a hash value associated with the target data 413 in the network 400. In some embodiments, as shown in FIG. 4, the node 421 in the network 400 includes a distributed hash table (DHT) 401-1. An example implementation of the distributed hash table 401-1 is shown in FIG. 4, where the distributed hash table 401 includes a hash value of data stored in a node 201. The hash value is the information associated with the data. For example, if the data are presented in the form of a file, the hash value may be the name of the file. Moreover, the distributed hash table 401-1 further includes an IP address of the data stored in the network 400. The hash value has a correspondence relation with the IP address. As shown in FIG. 5, the node 421 may obtain, based on the hash value, the IP address of the replica of the target data 413 in the network 400. The node 421 determines, based on the IP address, the node 423 which stores a replica of the target data 413.

At block 320, maintenance for the replica of the target data 413 is executed. The node 421 maintains the replica of the target data 413 in the network 400, and thus changes storage distribution of the replica of the target data 413 in the network 400 when necessary. As shown in FIG. 3, the block 320 includes blocks 330, 340 and 350.

At block 330, the number of available nodes in one or more nodes, e.g., 421, 422, 423, and 424, is determined. The node 421 may determine the nodes 423 that ought to store the target data 413 in the network 400 based on the distributed hash table 401-1, and send, to the each of nodes 423, a status request on whether it is operating normally. The node 421 receives the status information from these nodes 423, which store the target data 413. If the information returned from one of these nodes 423 indicates that the nodes 423 are operating normally, the node 421 determines the node 423 as an available node. If information is not received from the node 423 within a certain period of time, the node 423 is determined by the node 421 as an unavailable node. In this way, by performing a similar operation on each node storing the target data 413, the node 421 determines the number of available nodes storing the target data 413 in the network 400.

At block 340, the number of available nodes is compared with the predetermined (or desired) number of replicas of the target data 413 in the network 400. The desired number of replicas in the network 400 may be set by a user according to the actual requirement. It is apparent that, if the target data 413 have a higher significance, a desired predetermined number of replicas is greater. If the target data 413 have a low significance, a desired predetermined number of replicas is smaller.

At block 350, in response to the number of available nodes being different than the predetermined number, the storage distribution of replicas of the target data 413 in the network 400 is changed. Based on the relationship between the predetermined number and the number of available nodes storing the target data 413 in the network 400, the replicas of the target data 413 are operated to enable the number of the available nodes to be equal to the predetermined number. In a case that all the nodes in the network run normally, the number of available nodes in the network 400 should be equal to the predetermined number.

According to embodiments of the present disclosure, the maintenance of the replicas of the target data 413 in the network 400 can be implemented without a master node 101. In this way, the storage capacity of the network 400 is not limited by the storage capacity of the master node 101, and thus can be expanded significantly.

In some embodiments, as shown in FIG. 4, when the node 421 is monitoring the replicas of the target data 413, if one node 423 which stores a further replica of the target data 413 in the network 400 fails due to an uncontrollable external factor (for example, power failure), the node 423 is unable to send a message to the node 421. In this case, the node 421 determines that the node 423 has failed. At this time, the node 421 determines that the number of available nodes in the network 400 is less than the predetermined number. In the case, the node 421 may send a request to other nodes 422, 424 in the network 400, to create a new replica of the target data 413 on a certain node in the network 400. The node, on which the new replica is to be created, may be a node selected randomly from the available nodes in the network 400, except the node 421.

If more than one node in the network 400 fails due to an uncontrollable external factor, the node 421 can send a request to other nodes 422, 424 in the network 400, so as to create replicas of the target data 413 on a plurality of nodes in the network 400. These nodes may be a plurality of nodes selected randomly from the available nodes in the network 400, except the node 421, thereby ensuring that the number of available nodes in the network 400 is equal to the predetermined number in the changed storage distribution of replicas of the target data 413.

As shown in FIG. 4, when the node 421 is monitoring the replica of the target data 413, if the node 423 storing a further replica of the target data 413 in the network 400 is unable to send a message to the node 421 within a certain period of time due to a temporary failure (for example, slowdown of the network 400), the node 421 determines that the node 423 has failed, sends a request to other nodes 422, 424 in the network 400, and thus creates a new replica of the target data 413 on a certain node in the network 400, to ensure that the number of available nodes in the network 400 is equal to the predetermined number, as discussed above. If the temporary failure of the node 423 is ruled out in the future running, the number of the available nodes in the network 400 is then greater than the predetermined number. In the case, the node 421 may send a request to other nodes 422, 424 in the network 400, and then delete the replica of the target data 413 from the certain node in the network 400. If the number of the available nodes in the network 400 is greater than the predetermined number by two or more, the node 421 may send a request to a plurality of other nodes in the network 400, such that the replicas of the target data 413 are deleted from the multiple nodes in the network 400. In this way, it ensures that the number of available nodes in the network is equal to the predetermined number in the changed storage distribution of replicas of the target data 413.

In this way, it is implemented that the storage condition of the replicas of the target data 413 in the network 400 is changed. In the environment of Internet, embodiments of the present disclosure may ensure that the replicas of the target data 413 in the network 400 are not redundant and that there are an appropriate number (e.g., a pre-determined number) of replicas.

In some embodiments, referring to FIG. 4, in the node 421, there is a timestamp corresponding to the target data 413 stored in the node 421, for recording the time point when the target data 413 was last maintained by the node 423. Each of nodes 421, 422, 423, 424 of the network 400 may maintain the data on the node periodically. For example, the node 421 executes maintenance in a cycle of $\Delta t$. Referring to FIG. 4, the target data 413 are stored on the node 421 and the node 423. In some embodiments, the update cycles for certain target data 413 on different nodes may be the same, and for example, a first node and a second node determine every $\Delta t$, for the target data 413, whether the replicas of the target data 413 are maintained.

For example, it is assumed that the maintenance cycle of the network 400 is $\Delta t=30$ s, and further assumed that the node 421 determines whether the replica is maintained at the time points $t_0$, $t_0+30$ s, $t_0+60$ s, and the like. As there may be, for example, a time difference (for example, 15 s) between the local time of the node 421 and the local time of the node 423, the node 423 determines whether the replica of the target data 413 is maintained at the time points $t_0-15$ s, $t_0+15$ s, $t_0+45$ s, and the like. At time point $t_0$, the timestamp of the node 421 records the time point when the node 423 last executed replica maintenance, namely at $t_0-15$ s. At this time point, the node 421 compares the time $t_0-15$ s recorded by the timestamp with the current time $t_0$. If the time length since the time point of the timestamp exceeds a predetermined threshold ($\Delta t=30$ s), the node 421 executes replica maintenance for the target data 413. If the time length starting from the time point of the timestamp does not exceed the predetermined threshold, the replica maintenance for the target data 413 is not executed. For example, if the timestamp in the node 421 is $t_0-15$ s, then the target data 413 was maintained 15 seconds ago, and therefore it is unnecessary to maintain the replica again, in the environment where the maintenance cycle is $\Delta t=30$ s.

In this way, the maintenance frequency of a node in the network 400 can be optimized, thereby avoiding unnecessary maintenance.

In some embodiments, referring to FIG. 4, the node 421 includes thereon a local database stored at the node 421, which is also referred to as data protection database (DPD) 402. As shown in FIG. 4, the DPD 402 includes therein the hash value of the target data 413 stored locally at the node 4221 and the timestamp associated with the target data 413. The timestamp may be Unix time, which can be unified within the same time zone, for example, the Greenwich time. In this way, the updated timestamp is stored in the DPD 402, facilitating a convenient read operation of the node 421.

As shown in FIG. 4, in an alternative embodiment, the node 201 may further include a storage repository 403 which can include a hash value associated with the target data 413 stored in the node 201 and a path of the target data 413 stored in the node 421.

In some embodiments, referring to FIG. 4, when maintenance for the replica of the target data 413 is executed at a certain time point in the node 421, the timestamp in the node 421 is updated according to that time point, and a message is broadcast to the node 423 storing the target data 413 in the network 423, to enable the timestamps of the node 423 to also be updated. For example, after the node 421 executes replica maintenance at $t_0$, the timestamp information of the node 423 is updated to $t_0$. When the node 423 is required to execute next replica maintenance at $t_0+15$ s, it is determined whether replica maintenance of the target data 413 is started, based on the updated timestamp $t_0$ and the current time point $t_0+15$ s. As such, by utilizing interaction between nodes, the maintenance frequency of the nodes in the network 400 can be optimized.

In some embodiments, the target data may be one of a plurality of data blocks of a data item. For example, as shown in FIG. 4, if the size of the target data is quite large, it is split into a plurality of target data blocks 411, 412, 413. These target data blocks 411, 412, 413 are not stored on a single node but rather dispersed over the network 400, thereby being stored appropriately at different nodes in the network 400. These target data blocks 411, 412, 413 may be the same or different in size. The specific sizes of the target data blocks 411, 412, 413 are not limited to the present disclosure. These target data blocks 411, 412, 413 can be reintegrated, to restore the original target data.

An association between single data blocks may be recorded in a hash chain. As an example, the node 424 may include a metadata node 414, and the metadata node 414 may include the hash chain. The hash chain records the condition of the splitting of the target data, including the number of target data blocks 411, 412, 413, and locations of these target data blocks 411, 412, 413 in the network 400, and the like. As shown in FIG. 4, when the node 421 is monitoring the replica of the target data, the node 421 may obtain the location of the metadata node 414 in the network 400 (which is on the node 424, for example) via a current routing mechanism. The routing mechanism may utilize the mechanism as recited in "Maymounkov, P., & Mazieres, D. (2002, March). *Kademlia: A peer-to-peer information system based on the xor metric. In International Workshop on Peer-to-Peer Systems* (pp. 53-65). Springer, Berlin, Heidelberg". The node 421 can obtain a hash chain associated with the data item from the metadata 414 in the network 400, and determine the nodes stored by the target data blocks 411, 412, 413 via the hash chain.

In this way, replica maintenance can be executed for data of a larger size.

As shown in FIG. 4, the procedure as shown in FIG. 4 may be performed on clouds which can be for example, common clouds or private clouds. The specific configuration is not limited to the present disclosure.

As seen from the above description, the solution for data processing as proposed in the example embodiments of the present disclosure can implement maintenance of target data in absence of the master node 101, such that the target data in the network 400 can be kept in a predetermined number, and the data storage capacity of the network 400 can be expanded.

Figure 6:
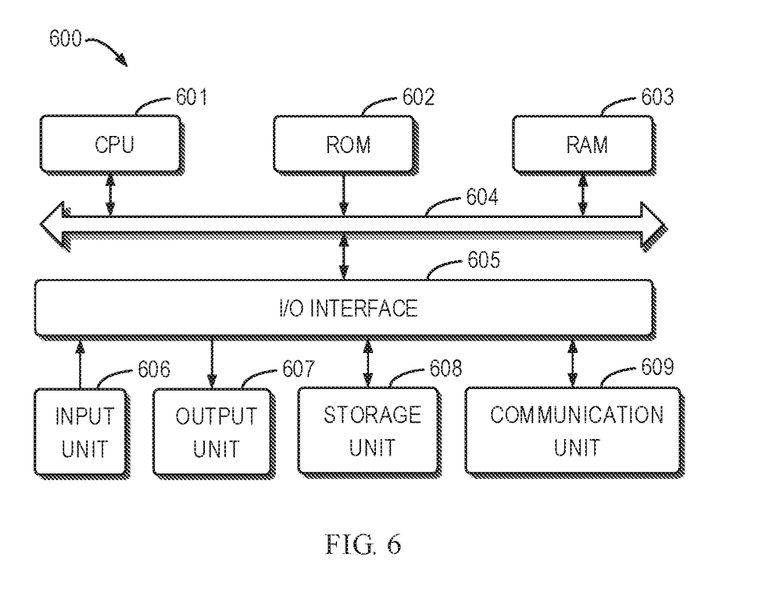
FIG. 6 illustrates an example block diagram of an example device that can be used to implement embodiments of the present disclosure.

FIG. 6 illustrates a schematic block diagram of an example device 600 for implementing embodiments of the present disclosure. As illustrated, the device 600 includes a Central Processing Unit (CPU) 601 which may execute various appropriate acts and processing based on computer program instructions stored in a Read-Only Memory (ROM) 602 or computer program instructions loaded from a storage unit 608 to a Random-Access Memory (RAM) 603. The RAM 603 stores therein a variety of programs and data required for operations of the device 600. The CPU 601, the ROM 602 and the RAM 603 are connected via a bus 604 with one another. An Input/Output (I/O) interface 605 is also connected to the bus 604.

A plurality of components in the device 600 are connected to the I/O interface 605 including an input unit 606 such as a keyboard, a mouse etc; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and procedure described above, e.g., the method 300, may also be executed by the processing unit 601. For example, in some embodiments, the method 300 may be implemented as a computer software program tangibly included in a machine-readable medium, e.g., the storage unit 608. In some embodiments, the computer program may be partially or fully loaded and/or mounted onto the device 600 via ROM 602 and/or communication unit 609. When the computer program is loaded to the RAM 603 and executed by the CPU 601, one or more steps of the method 300 as described above may be executed.

The present disclosure may be a method, a device, a system, and/or a computer program product. The computer program product may include a computer-readable storage medium having computer-readable program instructions thereon for causing a processor to carry out aspects of the present disclosure.

The computer-readable storage medium may be a tangible device that can retain and store instructions used by instructions execution device. The computer-readable storage medium may be, for example, but is not limited to, an electronic storage device, a magnetic storage device, an optical storage device, an electromagnetic storage device, a semiconductor storage device, or any suitable combination thereof. A non-exhaustive list of more specific examples of the computer-readable storage medium includes the following: a portable computer diskette, a hard disk, a Random Access Memory (RAM), a Read-Only Memory (ROM), an erasable programmable Read-Only Memory (EPROM or Flash memory), a Static Random Access Memory (SRAM), a portable compact disc Read-Only Memory (CD-ROM), a digital versatile disk (DVD), a memory stick, a floppy disk, a mechanically encoded device such as punch-cards or raised structures in a slot having instructions recorded thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and the conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the scenario involving the remote compter, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be appreciated that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the present disclosure have been described for purposes of illustration, but are not intended to be exhaustive or limited to the embodiments disclosed. Many modifications and variations will be apparent to those of ordinary skill in the art without departing from the scope and spirit of the described embodiments. The terminology used herein is chosen to best explain the principles of the embodiments, the practical application or technical improvement over technologies found in the marketplace, or to enable others of ordinary skill in the art to understand the embodiments disclosed herein.

We claim:

1. A method of data processing, comprising:
    obtaining from a local database on a first node in a network, a first timestamp previously stored in the local database associated with a target data, the first timestamp recording a time point when a second node executes last replica maintenance for the target data, the second node being different than the first node;
    in response to a time length since the time point recorded by the first timestamp exceeding a predetermined threshold, making a first determination to execute replica maintenance for the target data;
    making a second determination, by the first node in the network and based on a hash value associated with the target data in the network, of a plurality of nodes in the network, each storing a separate replica of the target data;
    executing, based on the first determination and the second determination, replica maintenance for the target data, comprising:
        determining a number of available nodes from the plurality of nodes;
        comparing the number of the available nodes with a predetermined number of replicas of the target data in the network; and
        in response to the number of the available nodes being different than the predetermined number, changing storage distribution of replicas of the target data in the network.

2. The method of claim 1, wherein changing storage distribution of replicas of the target data comprises:
    in response to the number of the available nodes being greater than the predetermined number, deleting a replica of the target data from at least one of the plurality of nodes; and
    in response to the number of the available nodes being less than the predetermined number, creating a replica of the target data on at least one other node in the network.

3. The method of claim 1, further comprising:
    creating a second time stamp for recording a time point of the replica maintenance for the target data at the first node; and
    sending the second timestamp to other nodes in the network which store replicas of the target data.

4. The method of claim 1,
wherein the target data comprises a plurality of data blocks,
wherein the plurality of data blocks is associated with a data item, and
wherein determining the plurality of nodes comprises:
  obtaining a hash chain associated with the data item from a metadata node in the network, the hash chain recording a relationship among the plurality of data blocks; and
  determining the plurality of nodes based on the hash chain.

5. An electronic device, comprising:
at least one processing unit;
at least one memory coupled to the at least one processing unit and storing instructions executed by the at least one processing unit, the instructions, when executed by the at least one processing unit, causing the electronic device to perform a method, the method comprising:
  obtaining from a local database on a first node in a network, a first timestamp previously stored in the local database associated with a target data, the first timestamp recording a time point when a second node executes last replica maintenance for the target data, the second node being different than the first node;
  in response to a time length since the time point recorded by the first timestamp exceeding a predetermined threshold, making a first determination to execute replica maintenance for the target data;
  making a second determination, by the first node in the network and based on a hash value associated with the target data in the network, of a plurality of nodes in the network, each storing a separate replica of the target data;
  executing, based on the first determination and the second determination, replica maintenance for the target data, comprising:
    determining a number of available nodes from the plurality of nodes;
    comparing the number of the available nodes with a predetermined number of replicas of the target data in the network;
    in response to the number of the available nodes being different than the predetermined number, changing storage distribution of replicas of the target data in the network.

6. The electronic device of claim 5, wherein changing storage distribution of replicas of the target data comprises:
  in response to the number of the available nodes being greater than the predetermined number, deleting a replica of the target data from at least one of the plurality of nodes; and
  in response to the number of the available nodes being less than the predetermined number, creating a replica of the target data on at least one other node in the network.

7. The electronic device of claim 5, wherein the method further comprises:
  creating a second timestamp for recording a time point of the replica maintenance for the target data at the first node; and
  sending the second timestamp to other nodes in the network which stores replicas of the target data.

8. The electronic device of claim 5,
wherein the target data comprises a plurality of data blocks,
wherein the plurality of data blocks is associated with a data item, and
wherein determining the plurality of nodes comprises:
  obtaining a hash chain associated with the data item from a metadata node in the network, the hash chain recording a relationship among the plurality of data blocks; and
  determining the plurality of nodes based on the hash chain.

9. A computer program product, which is tangibly stored in a non-transitory computer storage medium and includes machine-executable instructions, the machine-executable instructions, when executed by a device, causing the device to execute a method, the method comprising:
  obtaining from a local database on a first node in a network, a first timestamp previously stored in the local database associated with a target data, the first timestamp recording a time point when a second node executes last replica maintenance for the target data, the second node being different than the first node;
  in response to a time length since the time point recorded by the first timestamp exceeding a predetermined threshold, making a first determination to execute replica maintenance for the target data;
  making a second determination, by the first node in the network and based on a hash value associated with the target data in the network, of a plurality of nodes in the network, each storing a separate replica of the target data;
  executing, based on the first determination and the second determination, replica maintenance for the target data, comprising:
    determining a number of available nodes from the plurality of nodes;
    comparing the number of the available nodes with a predetermined number of replicas of the target data in the network;
    in response to the number of the available nodes being different than the predetermined number, changing storage distribution of replicas of the target data in the network.

10. The computer program product of claim 9, wherein changing storage distribution of replicas of the target data comprises:
  in response to the number of the available nodes being greater than the predetermined number, deleting a replica of the target data from at least one of the plurality of nodes; and
  in response to the number of the available nodes being less than the predetermined number, creating a replica of the target data on at least one other node in the network.

11. The computer program product of claim 9, wherein the method further comprises:
  creating a second time stamp for recording a time point of the replica maintenance for the target data at the first node; and
  sending the second timestamp to other nodes in the network which store replicas of the target data.

12. The computer program product of claim 9,
wherein the target data comprises a plurality of data blocks,
wherein the plurality of data blocks is associated with a data item, and
wherein determining the plurality of nodes comprises:
  obtaining a hash chain associated with the data item from a metadata node in the network, the hash chain recording a relationship among the plurality of data blocks; and
  determining the plurality of nodes based on the hash chain.

* * * * *